United States Patent
Kirkland et al.

(10) Patent No.: US 8,156,684 B2
(45) Date of Patent: Apr. 17, 2012

(54) PEST CONTROL BAIT STATION

(75) Inventors: Kevin L. Kirkland, Knoxville, TN (US); Tracy D. Malone, Knoxville, TN (US); Janet L. Kintz-Early, Knoxville, TN (US)

(73) Assignee: Nisus Corporation, Rockford, TN (US)

( * ) Notice: Subject to any disclaimer, the term of this patent is extended or adjusted under 35 U.S.C. 154(b) by 146 days.

(21) Appl. No.: 12/487,148

(22) Filed: Jun. 18, 2009

(65) Prior Publication Data

US 2010/0319239 A1     Dec. 23, 2010

(51) Int. Cl.
    A01M 1/20    (2006.01)
(52) U.S. Cl. ............................... 43/131; 43/121
(58) Field of Classification Search ............ 43/131, 43/121
    See application file for complete search history.

(56) References Cited

U.S. PATENT DOCUMENTS

| | | | | |
|---|---|---|---|---|
| 649,484 | A * | 5/1900 | Schlachter et al. | 43/121 |
| 1,000,368 | A * | 8/1911 | Borkenhagen | 43/121 |
| 1,797,743 | A * | 3/1931 | Wesson | 43/121 |
| 1,964,611 | A * | 6/1934 | Watson | 43/131 |
| 2,157,953 | A * | 5/1939 | De Long | 43/131 |
| 2,424,421 | A * | 7/1947 | Temme | 43/121 |
| 2,565,142 | A * | 8/1951 | Mattingly | 43/121 |
| 2,606,391 | A * | 8/1952 | McGrew | 43/121 |
| 3,427,743 | A | 2/1969 | Brunner et al. | |
| 3,747,260 | A * | 7/1973 | Lovness | 43/131 |
| 3,851,417 | A * | 12/1974 | Wunsche | 43/121 |
| 4,026,064 | A * | 5/1977 | Baker | 43/131 |
| 4,030,233 | A * | 6/1977 | Wunsche | 43/121 |
| 4,035,946 | A * | 7/1977 | Rapp et al. | 43/131 |
| 4,173,093 | A * | 11/1979 | Nakai | 43/121 |
| 4,202,129 | A * | 5/1980 | Greenberg | 43/131 |
| 4,316,344 | A * | 2/1982 | Carlsen | 43/121 |
| 4,563,836 | A * | 1/1986 | Woodruff et al. | 43/131 |
| 4,619,071 | A * | 10/1986 | Willis | 43/131 |
| 4,658,536 | A * | 4/1987 | Baker | 43/131 |
| 4,793,093 | A | 12/1988 | Gentile | |
| 4,837,969 | A * | 6/1989 | Demarest | 43/131 |
| 4,841,669 | A * | 6/1989 | Demarest et al. | 43/131 |
| 5,490,349 | A * | 2/1996 | Muramatsu | 43/121 |
| 5,522,172 | A * | 6/1996 | Clark | 43/131 |
| 5,548,922 | A * | 8/1996 | Wefler | 43/131 |
| 5,628,143 | A * | 5/1997 | Doucette | 43/131 |
| 5,802,761 | A | 9/1998 | Demarest et al. | |
| 5,857,286 | A * | 1/1999 | Doucette | 43/131 |
| 5,953,854 | A | 9/1999 | Hyatt | |
| 5,960,585 | A * | 10/1999 | Demarest et al. | 43/131 |
| 5,983,558 | A * | 11/1999 | Las et al. | 43/131 |
| 6,041,542 | A * | 3/2000 | Payton et al. | 43/131 |
| 6,164,010 | A * | 12/2000 | Snell et al. | 43/131 |

(Continued)

FOREIGN PATENT DOCUMENTS

DE    3140658 A1 *    4/1983

(Continued)

*Primary Examiner* — Darren W Ark
(74) *Attorney, Agent, or Firm* — Luedeka Neely Group, P.C.

(57) ABSTRACT

A pest control bait station having separated bait reservoirs for holding different kinds of bait. The bait station has raised regions with pest access apertures. Each aperture is aligned with at least a portion of a pest conveyance structure extending from the base walls of the reservoirs, providing a space for the pest to enter and exit the bait station. The bait in each reservoir is prevented from contacting bait in any other reservoir. At least one reservoir may contain a liquid bait, and at least one reservoir may contain a dry bait.

16 Claims, 8 Drawing Sheets

U.S. PATENT DOCUMENTS

| | | | |
|---|---|---|---|
| 6,195,933 B1 * | 3/2001 | Woodruff | 43/131 |
| 6,216,384 B1 * | 4/2001 | Dickson et al. | 43/131 |
| 6,272,791 B1 * | 8/2001 | Pleasants | 43/131 |
| 6,343,434 B1 * | 2/2002 | Petti | 43/131 |
| 6,370,813 B1 * | 4/2002 | Nelson et al. | 43/131 |
| 6,378,243 B1 * | 4/2002 | Snell et al. | 43/131 |
| 6,467,216 B2 * | 10/2002 | McManus et al. | 43/131 |
| 6,532,696 B2 * | 3/2003 | Clark et al. | 43/131 |
| 6,618,983 B1 * | 9/2003 | Spragins | 43/131 |
| 6,651,378 B2 * | 11/2003 | Baker | 43/131 |
| 6,655,079 B1 * | 12/2003 | Bernard et al. | 43/131 |
| 6,675,527 B1 * | 1/2004 | Barere | 43/131 |
| 6,739,087 B2 * | 5/2004 | Weiser et al. | 43/131 |
| 6,792,713 B2 * | 9/2004 | Snell | 43/131 |
| 6,871,444 B1 * | 3/2005 | Bernard et al. | 43/131 |
| 6,925,749 B2 * | 8/2005 | Wong | 43/121 |
| 7,043,873 B2 * | 5/2006 | Westphal et al. | 43/131 |
| 7,204,054 B2 * | 4/2007 | Mayo et al. | 43/131 |
| 7,299,587 B1 * | 11/2007 | Metcalfe | 43/121 |
| 7,310,908 B2 * | 12/2007 | Bernard et al. | 43/131 |
| 2003/0145511 A1 * | 8/2003 | Finn et al. | 43/131 |
| 2005/0252074 A1 * | 11/2005 | Duston et al. | 43/131 |
| 2008/0104882 A1 * | 5/2008 | Bernard et al. | 43/131 |
| 2008/0313952 A1 * | 12/2008 | Pettigrew et al. | 43/131 |
| 2010/0205850 A1 * | 8/2010 | Bernard | 43/131 |
| 2011/0088310 A1 * | 4/2011 | Parker et al. | 43/131 |
| 2011/0252695 A1 * | 10/2011 | Pryor | 43/131 |
| 2011/0258908 A1 * | 10/2011 | Zhou et al. | 43/131 |

FOREIGN PATENT DOCUMENTS

| | | | |
|---|---|---|---|
| EP | 392935 A1 * | 10/1990 | |
| EP | 1078572 A1 * | 2/2001 | |
| EP | 2100504 A2 * | 9/2009 | |
| GB | 2023987 A * | 1/1980 | |
| GB | 2071980 A * | 9/1981 | |
| JP | 11318305 A * | 11/1999 | |
| JP | 2001136888 A * | 5/2001 | |
| JP | 2002209499 A * | 7/2002 | |
| JP | 2002320437 A * | 11/2002 | |
| JP | 2003128119 A * | 5/2003 | |
| JP | 2003134981 A * | 5/2003 | |
| JP | 2003225041 A * | 8/2003 | |
| JP | 2005058207 A * | 3/2005 | |
| JP | 2008173205 A * | 7/2008 | |
| JP | 2009159842 A * | 7/2009 | |
| JP | 2009178116 A * | 8/2009 | |
| WO | WO 9115951 A1 * | 10/1991 | |

* cited by examiner

PEST CONTROL BAIT STATION

TECHNICAL FIELD

The present disclosure relates to the field of pest control, in particular insect pest control, and more particularly to bait stations configured for providing different forms of bait to the pests desired to be controlled. The bait may be contained in separated bait reservoirs.

BACKGROUND

Safety (i.e., limiting undesirable human or animal exposure to pesticides) and efficacy of control are some of the primary concerns when implementing pest control strategies. There is an ever present and evolving need for safer and more effective pest control measures, especially with regard to the control of insect pests. The present disclosure provides a safe, effective, and inexpensive pest control bait station configured for providing different forms of bait to the pests desired to be controlled.

SUMMARY

One embodiment of the present disclosure provides a pest control bait station. The bait station has a cover member having at least one raised or domed region formed extending away from an outer surface of the cover member. The raised region has at least one pest access aperture formed therein per raised region, and may have a curved or flat roof-top like surface configured to shed water. The bait station also has a base member with a substantially planar seal member, and at least one bait well formed therein such that the seal member forms a perimeter around the well. Each bait well further entails a reservoir region circumscribed by an outer wall and having a base wall, and a pest conveyance structure that may be a flat-topped pyramidal structure extending upwards from the base wall of the well to about the plane of the seal member. The reservoir regions are pre-filled with a desired form of bait (i.e., liquid bait or dry bait).

The seal member is attached to an inner surface of the cover member providing a sealed perimeter around each well, such that each raised region is aligned with and covers a corresponding well, and the top of the pest conveyance structure is substantially aligned with the pest access aperture of the corresponding raised region to provide a pest access space for allowing a desired pest to enter and exit the bait station.

The sealed perimeter provides an impermeable barrier around the well so that no well is in any form of flow communication with any other well, and the only way for a pest to enter or exit a particular well is through the pest access aperture in the raised region over the well. Bait stations in accordance with the present disclosure may be configured to have one, two, three, four, or more, wells. The number of wells is not intended to be limiting in any way to the practice of the present invention. The present disclosure may provide bait stations suitable for the control of insect pests, such as ants or roaches, or larger pests such as rodents.

Another embodiment of the present disclosure may provide an ant bait station. In one embodiment, the ant bait station has a cover having at least two raised regions formed thereupon. The raised regions may have at least one ant access aperture per raised region.

The ant bait station also has a base portion having a substantially planar seal member and at least two bait wells formed therein such that the seal member forms a substantially planar perimeter around each well. Each of the bait wells also has a reservoir region circumscribed by an outer wall and having a base wall. A pest conveyance structure, which may be flat-peaked pyramidal structure, extends upwards from the base wall of the well to about the plane of the seal member. The reservoir regions may be pre-filled with bait.

The cover may be fixedly or removeably attached to the base, such that a sealed perimeter is provided around each well, and the raised regions are aligned with and cover the wells, and the top of the pest conveyance structure is substantially aligned with the ant access aperture of the corresponding raised region to provide an ant access space for allowing an ant to enter and exit the bait station.

The sealed perimeter provides an impermeable barrier between the wells so that no well is in any form of flow communication with any other well, and the only way for an ant to enter or exit a particular well is through the ant access aperture in the raised region over the well.

Bait stations in accordance with the present disclosure may be either disposable or refillable and reusable.

It is to be understood that both the foregoing general description and the following detailed description are exemplary and explanatory only and are not restrictive.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DESCRIPTION OF THE EXEMPLARY EMBODIMENTS

Figure 1:
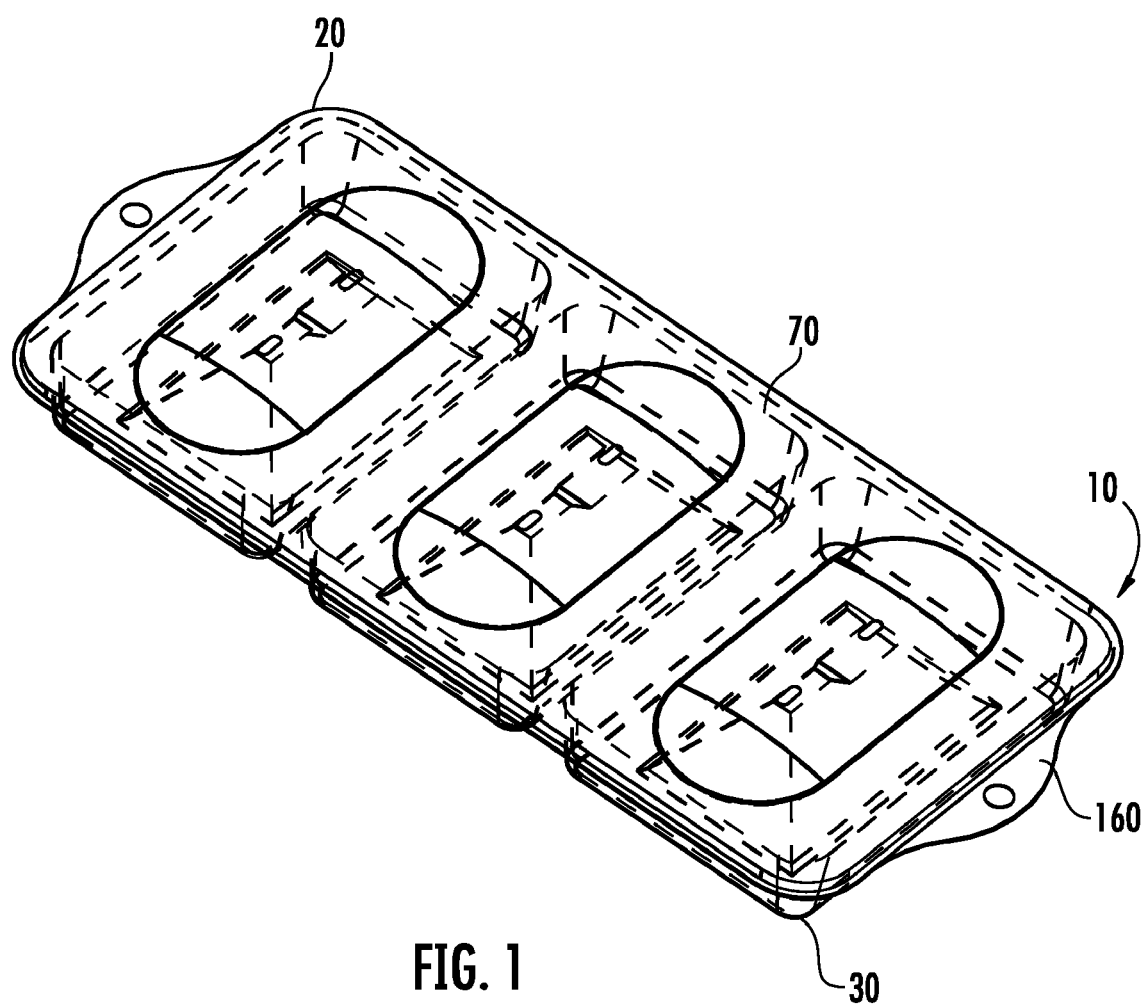
FIG. 1 is an illustrative diagram of a pest control bait station.
Figure 2A:
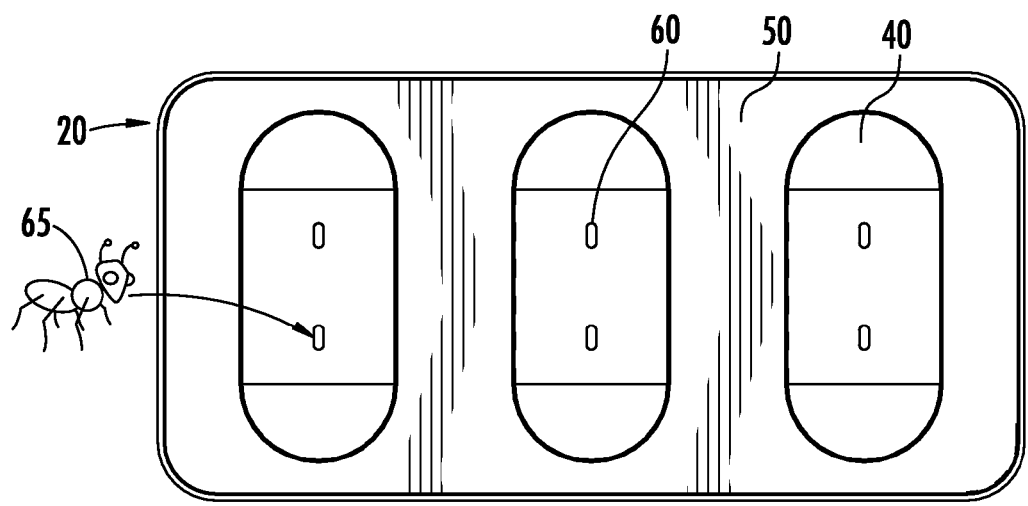
FIG. 2a. is an illustrative diagram of the overhead view of an cover member of the bait station.
Figure 2B:
FIG. 2b. is an illustrative diagram of a side profile view of the cover member.
Figure 2C:
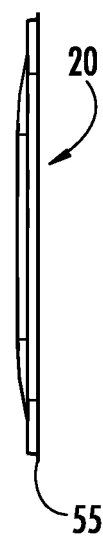
FIG. 2c. is an illustrative diagram of a front profile view of the cover member.
Figure 3A:
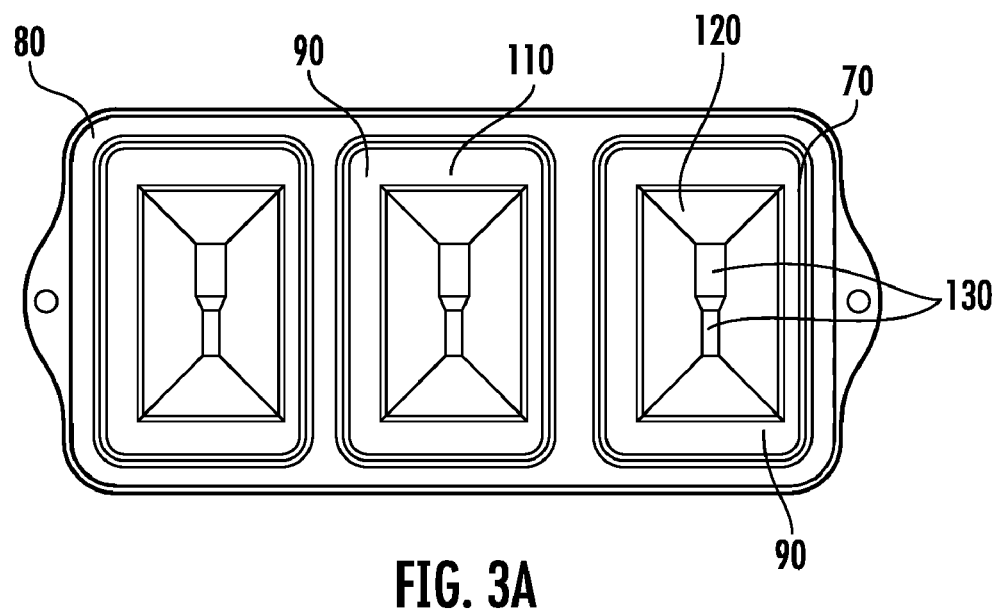
FIG. 3a is an illustrative diagram of the overhead view of a base member of the bait station.
Figure 3B:
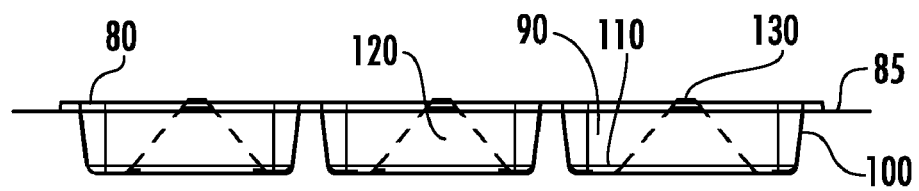
FIG. 3b. is an illustrative diagram of the side profile view of the base member.
Figure 3C:
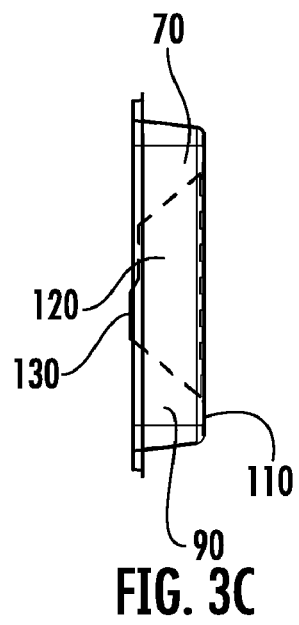
FIG. 3c. is an illustrative diagram of the front profile view of the base member.
Figure 4A:
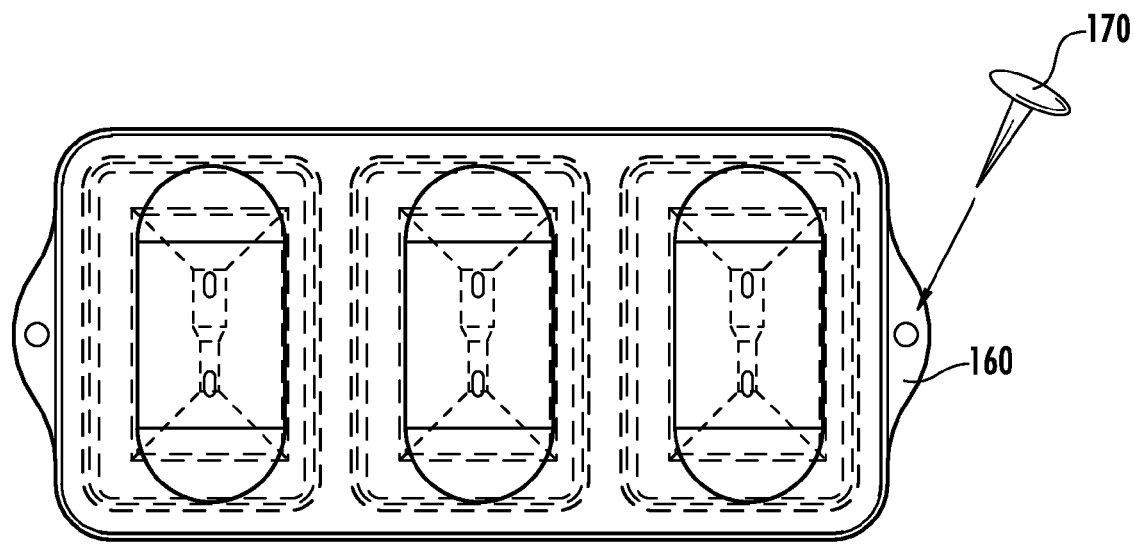
FIG. 4a. is an overhead view of the assembled bait station, showing the relative location and alignment of the raised region access holes and the flat-peaked pyramids.
Figure 4B:
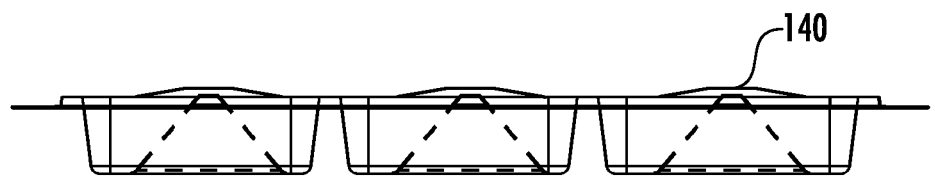
FIG. 4b. is a side profile view of the assembled bait station.
Figure 4C:
FIG. 4c. is a front profile view of the assembled bait station.

The present disclosure will now be described in the more limited aspects of preferred embodiments thereof, including various examples and illustrations of the formulation and use of the present disclosure. It will be understood that these embodiments are presented solely for the purpose of illustrating the invention and shall not be considered as a limitation upon the scope thereof.

As used herein, the word "bait" means any substance that is used for the attraction of pests, and in particular substances that have toxic or pesticidal properties. The bait may be in any suitable form, for example a liquid, a gel, a paste, a slurry, a powdered solid, a granular solid, etc.

The present disclosure provides a pest control bait station having at least one bait well, each well being provided with a raised region extending away from an outer surface covering the well. In one embodiment, the raised region may be a substantially domed region. Each raised, or domed, region may have at least one pest access aperture, dimensioned to allow a desired pest to enter and exit the bait station, proximal to the apex of the raised region. For example, if the pest desired to be controlled is an ant, then the aperture is dimensioned to allow access for the ant; likewise if the pest desired to be controlled is a roach, then the aperture is dimensioned to allow access for the roach.

The at least one bait well may include at least one liquid bait well that is pre-filled with a liquid bait, and/or at least one well that is pre-filled with a dry bait. It is desirable that the bait station apertures be dimensioned to allow the desired pest to enter a well and consume some of the bait and/or exit the bait station and convey at least a portion of the bait from at least one well to a nesting area, where other pests may consume the bait.

A particularly suitable embodiment of the present disclosure may have three wells, with two of the wells holding liquid bait, and one well holding dry bait. Also envisioned is an embodiment wherein two of the wells hold dry bait, and one of the wells holds liquid bait. In a further embodiment, all of the wells may hold the same type of bait.

Other possible configurations or combinations of the bait station wells not described explicitly herein are also intended to remain within the scope of the presently claimed disclosure. For example, embodiments having a larger liquid well and a smaller dry well, or vice versa, are also contemplated. In such embodiments, a large bait well may have at least two pest conveyance structures and corresponding raised regions without any subdivision or separation of the contents of the large well, in addition to a smaller bait well as described below, preferably with the wells containing different bait forms remaining separate. As a further example, the bait station may be configured as wells that may be separated into individual units, or separated into units having one or two wells per station. In another embodiment, the present disclosure may be configured as a bait station sheet containing a plurality of wells as described herein. The wells may be separated from the bait station sheet to provide individual bait stations having at least one, or two or more wells per bait station.

Bait stations in accordance with the present disclosure may be either disposable or refillable and reusable.

With reference now to FIGS. 1-4, a non-limiting example of a pest control bait station 10, may include a cover member 20 and a base member 30. The cover member 20 may include at least two raised, or domed, regions 40 formed therein and extending away from the outer surface of the cover member 20. Each raised region 40 is surrounded by a substantially planar cover region 50.

The cover member 20 may be bounded by a cover rim 55 extending downward from an inner side thereof and having an inner slope of about 5-15°.

Each raised region 40 may have at least one pest access aperture 60 formed therein proximal to the apex of the raised region 40. The pest access apertures 60 may be dimensioned to allow a desired pest 65 to enter and exit a bait-containing well 70 concealed beneath the raised region 40 in the base member 30 the of the bait station 10.

The raised regions 40 may advantageously act to shed water away from the pest access apertures 60 so that the only rain that may enter the well 70 may be by a direct hit of a rain drop on an aperture 60.

The base member 30 may include at least two bait-containing wells 70 formed therein, corresponding to and aligned with the domed regions 40 of the cover member 20.

The bait containing wells 70 are surrounded by a substantially planar sealing member 80 which may be circumscribed by a base flange 85 extended downwards from the outer surface of the sealing member 80. The base flange 85 may have a slight slope, such as from about 5-15°. The base flange preferably has about the same degree of slope, in an opposite direction from the slope of the cover rim 55, for mating with the cover rim 55 and forming a seal to the cover member 20.

Each bait well 70 is further composed of a reservoir region 90, circumscribed by an outer wall 100, and having a base wall 110 (it is referred to herein as a base wall 110 instead of a bottom surface because the bait station may be mounted vertically as well as staked to the ground as described below). A pest conveyance structure, which may be a pyramidal structure 120 having one or more flattened peaks 130, extends away from the base wall 110 of the well 70 to just above the plane of the sealing member 80. The sides of the pyramidal structure 120 may have a slope ranging from about 30° to about 80°, for example from about 40° to about 70°, or as a further example from about 50° to about 60°. The flattened peaks 130 may be stepped to provide two substantially level surfaces of different heights. The pyramidal structures 120 may have roughened surfaces (not shown) to help pests both get in and out of the bait station 10 without getting trapped or, in the case of a well 70 containing liquid bait, drowning in the bait.

The bait wells 70 and reservoir regions 90 may vary in capacity according to the pest desired to be controlled. In the case of an insect pest, such as an ant or a roach, a suitable capacity for the liquid bait well may range from about 1 to about 10 ounces of liquid bait, for example about 4 ounces of liquid bait. A suitable capacity for the dry bait well may range from about 1 to about 10 ounces of dry bait, for example about 3 ounces of dry bait.

The pyramidal structures 120 may be dimensioned so that the flattened peaks 130 of the pyramidal structures 120 extend to a height ranging from slightly above to slightly below the plane of the sealing member 80, and are positioned just below and are substantially aligned with the pest access apertures 60 in the raised regions 40 of the cover member 20 when the bait station 10 is assembled. There is a slight spacing 140 between the raised region 40 and the peak 130 such that the pest 65 may crawl through an aperture 60 and reach a flat peak 130. Thus, the spacing 140 allows the pest 65 to crawl between the raised region 40 and the pyramidal structure 120 and then down one of the sides of the pyramidal structure 120 to contact the bait 150 in the reservoir region 90. The pest 65 may then crawl back out of the bait station 10 in the same manner.

The base member 30 is attached to the cover member 20. The inner side of the substantially planar cover region 50 and the outer side of the substantially planar sealing member 80 are aligned such that the tops of the flattened peaks of the pyramidal structures 120 of the wells 70 and the pest access apertures 60 of the raised regions 40 are substantially aligned. The attachment of the cover member 50 to the sealing member 80 ensures that the wells 70 are always separated, and prevents the contents of each well 70 from contacting one another.

The base member 30 and the cover member 20 may be formed from any suitable material, for example, PVC or other suitable plastic(s) or light gauge sheet metal. The base member 30 and the cover member 20 may be fixedly or removeably attached to each other by any suitable method, including adhesives, heat compression, welding, or other attachment methods. Such methods may vary depending on the materials the bait station 10 is constructed from. A primary concern in the practice of the present disclosure is that contents of the wells 70 remain separated from one another, so any method of construction that provides such separation may be sufficient.

One or more tabs 160 may be provided extending out from either the cover member 20 or the base member 30, and one or more spikes 170 may also provided for securing the tabs 160 to the ground by driving the spikes 170 through the tabs 160, which may have one or more appropriately sized apertures 180 to receive the spikes 170. Alternatively, the tabs 160 may be used to fasten, hang, or suspend a bait station 10 from a structure such as a wall, a tree, a fence post, or a pole. The bait station 10 may be fastened, hung, or suspended using fasteners such as string, hooks, cable, wire, or zip-ties (not shown).

FIGS. 5-8 illustrate another embodiment of the bait station 10, in accordance with the present disclosure. The bait station has a slightly different configuration in this embodiment, while remaining structurally and functionally equivalent to first embodiment described above.

The cover member 20 and base member 30 are configured to provide three separate wells 70. The wells may each have a molded, inclined pest conveyance structure 190, similar in function to the pyramidal structures 120 of the previous embodiment. The pest conveyance structure 190 may be embodied as a ramp having one or more facets, and extending upwards from the base wall 110 of a well 70, to provide a pest access to the bait 150 in the reservoir region 90.

Figure 5:
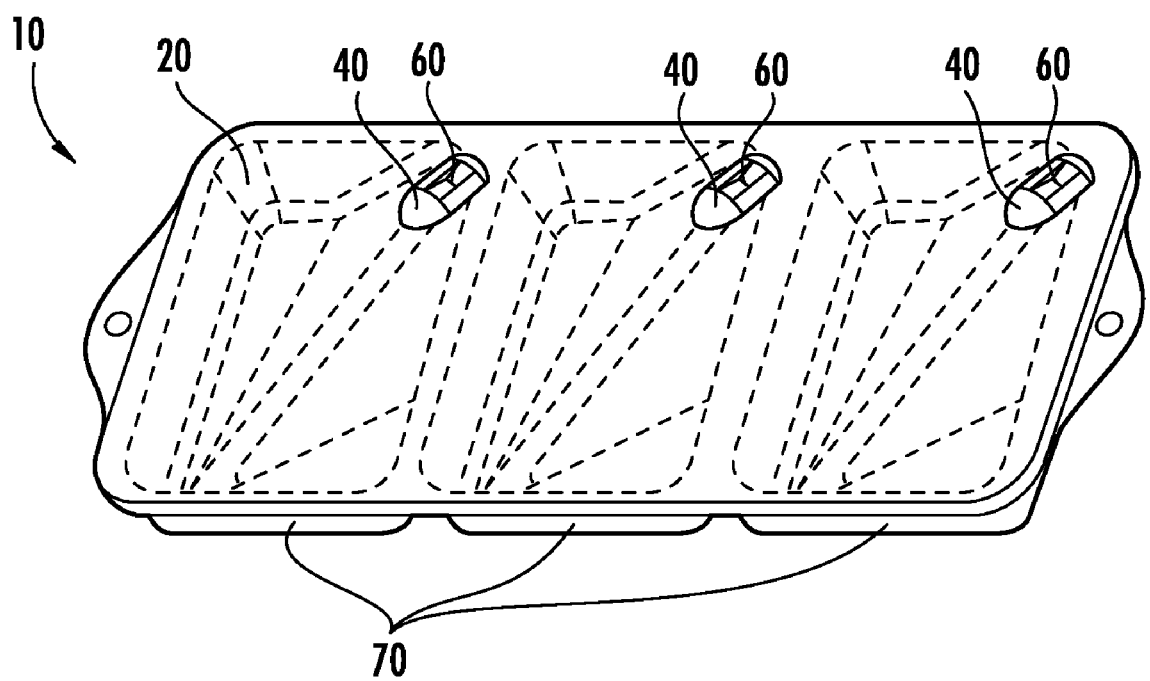
FIG. 5 is an illustrative diagram of another embodiment of a pest control bait station.
Figure 6A:
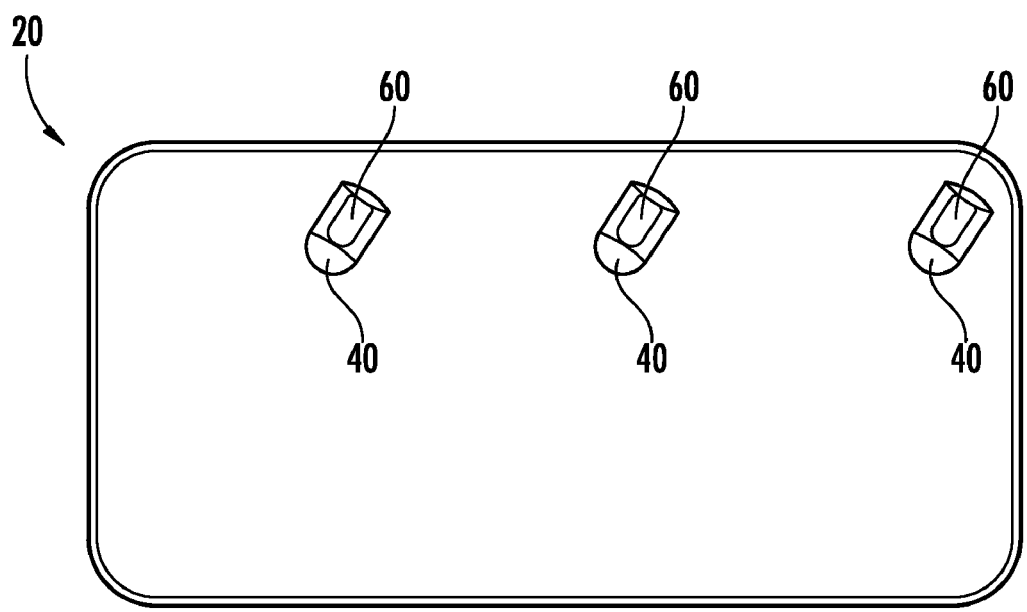
FIG. 6a. is an illustrative diagram of the overhead view of an cover member of the bait station.
Figure 6B:
FIG. 6b. is an illustrative diagram of a side profile view of the cover member.
Figure 6C:
FIG. 6c. is an illustrative diagram of a front profile view of the cover member.
Figure 7A:
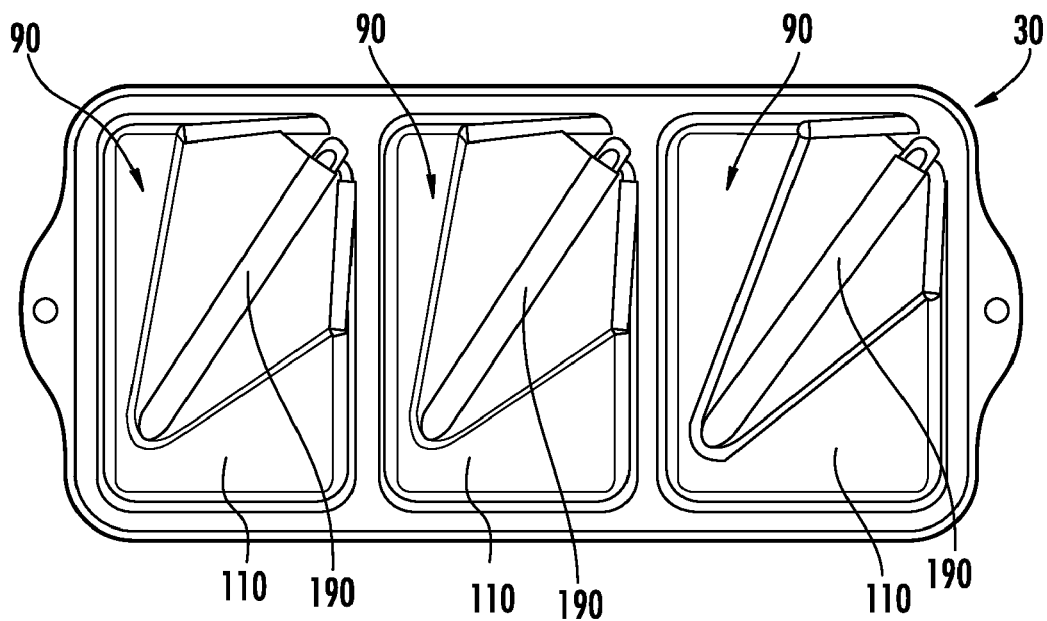
FIG. 7a is an illustrative diagram of the overhead view of a base member of the bait station.
Figure 7B:
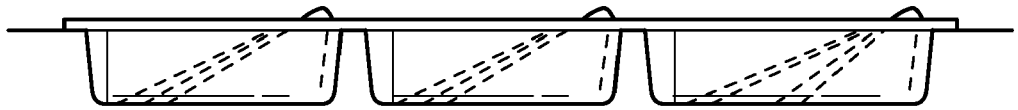
FIG. 7b. is an illustrative diagram of the side profile view of the base member.
Figure 7C:
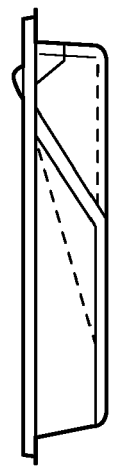
FIG. 7c. is an illustrative diagram of the front profile view of the base member.
Figure 8A:
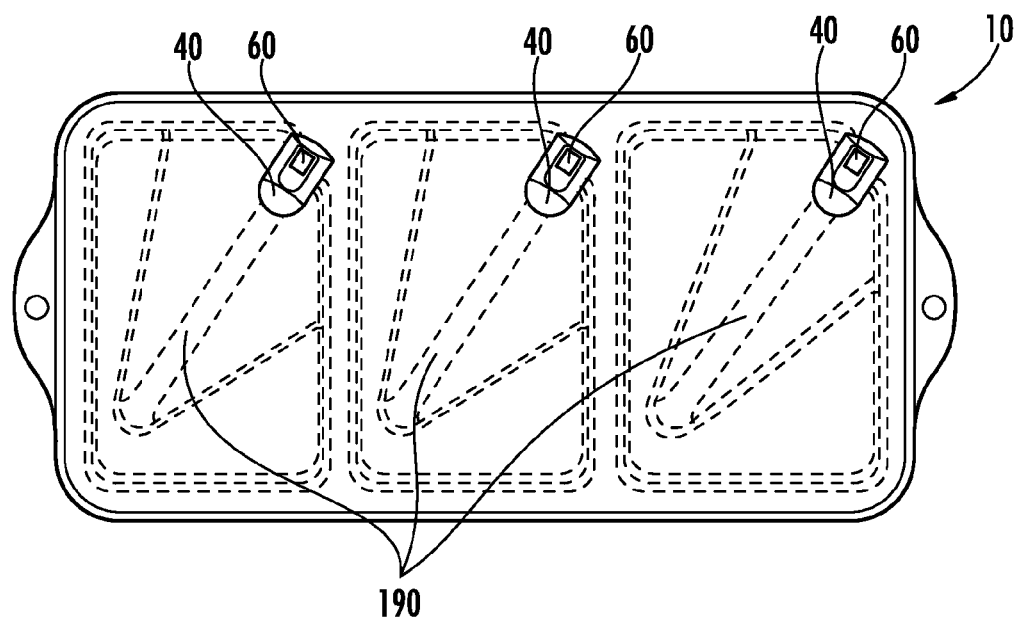
FIG. 8a. is an overhead view of the assembled bait station, showing the relative location and alignment of the raised region access holes and the pest conveyance structures.
Figure 8B:
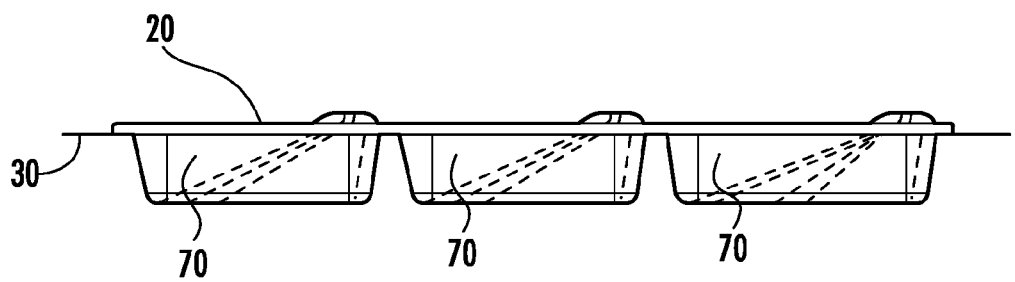
FIG. 8b. is a side profile view of the assembled bait station.
Figure 8C:
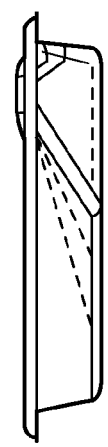
FIG. 8c. is a front profile view of the assembled bait station.

Referring to FIG. 5, the raised regions 40 and the pest access apertures 60 may be disposed on outer edges of the wells 70 so that the station 10 may be mounted vertically with each pest access aperture 60 positioned vertically above each corresponding well 70. In this embodiment, the bait station 10 may be mounted to a wall or other vertical structure without losing the contents of the reservoir region 90.

The bait station 10 may be disposable. When an exterminator visits a house he or she may remove an old bait station 10, throw it away, and install a fresh bait station 10 by securing it to the desired location with the tabs 160 and the spikes 170. In another embodiment, the bait station may be refillable by the exterminator. In this case, the station may be refilled and reused many times.

The following example is provided to further illustrate an embodiment of the present disclosure. This example is merely one possible embodiment of the present disclosure, and is not intended to be limiting in any manner. A person of ordinary skill in the art will recognize that the dimensions and configuration of the bait station are dependent, in part, upon the pest desired to be controlled.

Ant Bait Station

The presently disclosed bait station may be embodied as an ant bait station having the following dimensions and characteristics.

Cover Member

The cover member, or "cover", may be made from a substantially planar piece of transparent green PVC about 11⅛ inches in length, about 5½ inches in width, and having a thickness of about 0.015 inches. A rim of about ⅛ inch in height is formed extending away from the inner surface of the cover, having an inner angle of about 7°. The cover has three raised regions formed therein, each raised region extending away from the outer surface of the cover to about ⅛ inch above the outer surface of the cover. Each raised region has two separate ant access apertures formed approximately centrally therein (if the bait station needs to be mounted vertically, the raised regions and ant access apertures should be disposed on the outer edges of the wells). The apertures are about ⅛ inch wide by about 5/16 inch long.

Base Member

The base member may be made from a substantially planar piece of white PVC about 0.020 inches in thickness, about 12.25 inches in length, and about 5.5 inches in width. Three wells may be formed therein, extending away from the outer surface of the bottom member and being surrounded by the planar surface of the bottom member, each well being about 1 inch in depth, about 3.5 inches long at the top of the well, and about 2.5 inches in width, again, at the top of the well. Each well is circumscribed by an outer wall and has a base wall.

Extending from the base wall of each well is a two-stepped flat-peaked pyramidal structure having two substantially level surfaces, one level surface being disposed slightly above the plane of the base member, and one level surface being approximately equal in height to the plane of the base member. Each side of the pyramidal structure has a slope of about 50°, to allow the ants to walk down the pyramidal structure to reach the bait, and then climb back up and out of the bait station.

The wells, together with the pyramidal structures, provide bait reservoirs suitable for holding about 3 ounces of bait each. In an exemplary embodiment, two of the wells are filled with Terro-PCO, a liquid bait subregistered and sold by Nisus Corporation, and one of the wells is filled with Niban or Niban-FG, both being dry baits made by Nisus Corporation.

The cover member is aligned to the base member, already pre-filled with the desired baits, and the two members may be attached to one another by adhering the respective planar surfaces of the cover and the base, providing a fully assembled disposable bait station.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the invention being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A pest control bait station, comprising:
a cover member having at least one raised dome region formed thereupon and extending away from an outer surface thereof, the at least one raised dome region further having at least one pest access aperture per raised dome region;
a base member including a seal member and at least one bait well formed therein such that the seal member forms a perimeter entirely around each well, each bait well further having a reservoir region circumscribed by an outer wall and having a base wall;
a pest conveyance structure extending from the base wall of each well to a position proximate to the at least one pest access aperture, pest bait disposed in each reservoir for attracting and killing pests;
wherein the pest access aperture is formed on an apex of the dome region to reduce the entry of rain water into the at least one bait well and wherein the pest conveyance structure originates and extends away from the outer wall and substantially across the reservoir region of the base member;
wherein the seal member is attached to an inner surface of the cover member providing a sealed perimeter entirely around each of the at least one bait well that prevents the bait from moving through the sealed perimeter, such that the at least one raised dome region is spaced apart from the sealed perimeter and is aligned with the at least one well, and at least a portion of the pest conveyance structure is substantially aligned with the at least one pest access aperture of the corresponding raised dome region to provide a pest access space for allowing a desired pest to enter and exit the bait station.

2. A pest control bait station, comprising:
a cover member having an inner surface and outer surface,
a plurality of dome regions formed on the outer surface of the cover member, each dome region extending away from the outer surface and having an apex,
a plurality of pest access apertures for allowing a pest to enter and exit the bait station; each pest access aperture being formed on the apex of one of the dome regions to reduce the entry of rain water into the access apertures;
a base wall;
side walls, each side wall extending away from the base wall and toward the cover member and terminating at an edge of each side wall, the side walls and base wall being configured to form a plurality of bait wells, each bait well having a perimeter formed by the edges of the side walls, each bait well having a center and a first side disposed in a first direction away from the center of the bait well;
a seal member disposed along the edges of the side walls and along the perimeters of the bait wells, the seal member engaging the cover member to form a seal between the cover member and the entire perimeter of each bait well,
a plurality of reservoir regions, a reservoir region being formed in each bait well and being defined by the side walls and the base wall for holding pest bait for attracting and poisoning pests;
the domes being disposed on the cover so that a dome is positioned proximate to each first side of each bait well so that the pest access apertures provide access to each bait well; and
the domes being positioned vertically above respective reservoir regions when (1) the base wall is positioned horizontally or (2) when the base wall is positioned vertically with each first side positioned above its respective bait well.

3. The station of claim 2 further comprising a plurality of pest conveyance structures with a conveyance structure in each bait well, each conveyance structure extending from the base wall, extending substantially entirely across one of the bait wells and terminating at a position proximate one of the pest access apertures.

4. An insect bait station, comprising:
a cover including at least one raised dome region formed thereupon and extending away from an outer surface thereof, the at least one raised dome region further including at least one insect access aperture per raised dome region, wherein the insect access aperture is formed on an apex of the dome region;
a base including a seal member and at least a first bait well and a second bait well formed therein such that the seal member forms a perimeter entirely around each well and lies in a plane, wherein each bait well further includes a reservoir region circumscribed by an outer wall and having a base wall;
a pest conveyance structure extending from the base wall of each well to about the plane of the seal member, and wherein the first bait well comprises a liquid bait well having a reservoir region filled with a liquid bait, and the second bait well comprises a dry bait well having a reservoir region filled with a dry bait;
wherein the pest access aperture is formed on the apex of the dome region to reduce the entry of rain water into the at least one bait well, and wherein the pest conveyance structure originates and extends away from the outer wall and substantially across the reservoir region of the base;
wherein the cover is attached to the base, providing a sealed perimeter entirely around each of the at least one bait well, such that the raised dome region is aligned with and covers the well, and at least a portion of the pest conveyance structure is substantially aligned with the at least one insect access aperture of the corresponding raised dome region to provide an insect access space for allowing an insect to enter and exit the bait station; and
wherein the sealed perimeter provides an impermeable barrier around the well.

5. A pest control bait station, comprising:
a cover member having a first raised dome region, a second raised dome region, and a third raised dome region formed thereupon and extending away from an outer surface thereof, each raised dome region further having at least one pest access aperture per raised dome region;
a base member including a seal member and a first bait well, a second bait well, and a third bait well formed therein such that the seal member forms a perimeter entirely around each well, each bait well further having a reservoir region circumscribed by an outer wall and having a base wall, and wherein the first bait well and the second bait well are liquid bait wells filled with a liquid bait and the third bait well is a dry bait well filled with a dry bait;
a pest conveyance structure extending from the base wall of each bait well to a position proximate to each pest access aperture, the respective bait disposed in each reservoir for attracting and killing pests;
wherein each pest access aperture is formed on an apex of each corresponding dome region to reduce the entry of rain water into the bait wells; and
wherein the seal member is attached to an inner surface of the cover member providing a sealed perimeter entirely around each bait well that prevents the bait from moving through the sealed perimeter, such that each of the raised dome regions is spaced apart from the sealed perimeter and is aligned with each of the bait wells, and at least a portion of each pest conveyance structure is substantially aligned with each of the pest access apertures of the corresponding raised dome regions to provide a pest access space for allowing a desired pest to enter and exit the bait station.

6. The bait station of claim 5, further comprising securement tabs extending outwards from a member selected from the cover member, the base member, and a combination thereof.

7. The bait station of claim 6, wherein the securement tabs further comprise at least one securement aperture formed in each tab for securing the bait station to a desired location.

8. The bait station of claim 5, wherein the bait station is selected from the group consisting of a disposable bait station and a refillable bait station.

9. The bait station of claim 5 wherein each of the raised dome regions and each of the pest access apertures are disposed on outer edges of the wells so that the station may be mounted vertically with each pest access aperture positioned vertically above each corresponding well.

10. The bait station of claim 5, wherein each of the pest access apertures is dimensioned to allow entry and exit for insect pests selected from the group consisting of ants and roaches.

11. The bait station of claim 5, wherein
the pest conveyance structure extends from the base wall of each well to about the plane of the seal member.

12. The bait station of claim 11, further comprising one or more securement tabs extending outwards from a component selected from the cover, the bottom, and a combination thereof.

13. The bait station of claim 12, wherein the securement tabs further comprise at least one securement aperture formed in each tab for securing the bait station to a desired location.

14. The bait station of claim 11, wherein the bait station is selected from the group consisting of a disposable bait station and a refillable bait station.

15. The bait station of claim 11, wherein each raised dome region and each pest access aperture is disposed proximate an outer edge of each well so that the station may be mounted vertically with each pest access aperture positioned vertically above each corresponding well.

16. The bait station of claim 11, wherein each pest access aperture is dimensioned to allow entry and exit for insect pests selected from the group consisting of ants and roaches.

* * * * *